Nov. 11, 1958
J. J. LAINSON
2,859,476
EXTRUSION APPARATUS
Filed Aug. 1, 1955
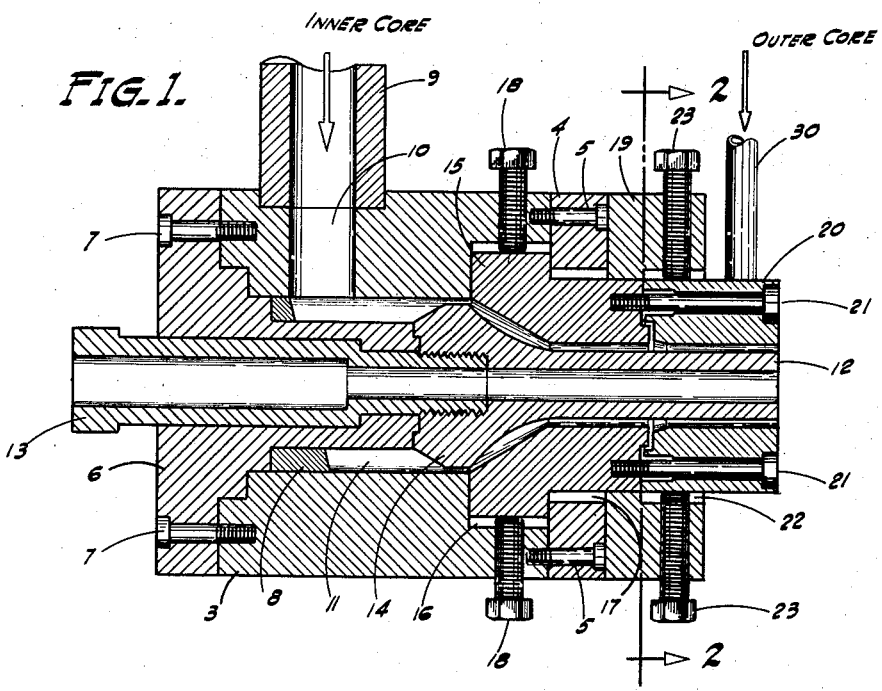
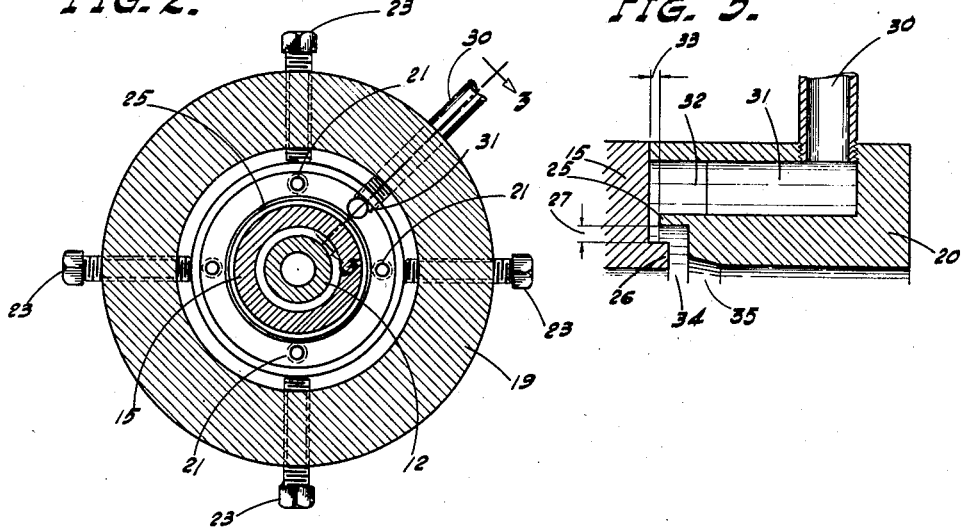
INVENTOR
JOHN J. LAINSON
BY *G. T. Douvas*
ATTORNEY

United States Patent Office 2,859,476
Patented Nov. 11, 1958

2,859,476

EXTRUSION APPARATUS

John J. Lainson, Hastings, Nebr., assignor to Western Plastics Corporation, Hastings, Nebr., a corporation of Nebraska Application August 1, 1955, Serial No. 525,513

10 Claims. (Cl. 18—13)

This invention relates to new and improved apparatus for fabricating tubing, and in particular to a die for extruding plastic tubing formed with multiple layers or cores.

A novel polyethylene tube is disclosed in applicant's co-pending application, Serial No. 456,179, filed September 15, 1954. The tube construction featured therein comprises an inner core of pure transluscent resin which is covered by an adhering outer core of resin. This outer core is processed with a conventional carbon-black agent to protect the tube against the deleterious effects of ultraviolet radiation. As is disclosed in detail in the copending application, a principal advantage resulting from this novel tube structure is the enforced improvement in the quality of constituent materials employed by the plastic industry. This result is attained because the inner transluscent layer permits the inspection and detection of inferior and foreign filler materials, whereas visual inspection of conventional polyethylene tubes is generally difficult because of the obscuring effect of the carbon black agent which is usually included throughout the entire tube wall.

Optimum design for the newly introduced tube is attained by fabricating the outer layer incorporating the carbon black agent with the minimum permissible thickness for the reason that this portion of the tubing is not subject to inspection and detection of foreign materials; and further, because the inclusion of carbon black in a substantially thicker outer wall does not effectively add to the protection against ultraviolet radiation.

It may be readily appreciated that a polyethylene tube constructed in accordance with the foregoing design should be fabricated by apparatus which will maintain a high degree of concentricity between the inner and outer tube cores, and also provide a high degree of adhesion between the contacting surfaces of the two cores. In the event that an outer core of minimum thickness is applied to the inner supporting core in a non-concentric alignment, a portion of the inner core will not be adequately protected against ultraviolet radiation and therefore the tube will be subject to premature deterioration. In the event that the adhesion between the two cores is defective, the resulting tube will have markedly reduced performance characteristics such as burst pressure, for example.

Accordingly, a principal object of this invention is to provide improved apparatus for extruding plastic tubing featuring multiple layer structures.

Another object of this invention is to improve the relative concentricity of each of the cores of a multiple-layer extruded tube, and also the concentricity of the total tube wall with respect to the tube bore.

Another object of this invention is to improve the performance characteristics of multiple-layer tubing through increased adhesion between the contacting surfaces of adjacent cores.

Another object of this invention is to provide a die for extruding multiple-layer tubes which is reliable in operation, and relatively easy and economical to fabricate, adjust and maintain.

A preferred embodiment of this invention features an improved structural arrangement for adjusting the relative concentricity of the various cores comprising a multiple-layer extruded tube, and also the concentricity of the total tube wall relative its bore. A pair of sleeves are suitably mounted within a die casing and over a pipe including a head serving as a shaping mandrel. The two sleeves are coupled one to the other and to the die casing in such a manner that adjustment of a first set of screws varies the relative concentricity of both sleeves with respect to the tube forming pipe and mandrel. This adjustment determines the concentricity of the total tube wall with respect to its bore.

One of the sleeves is also coupled to the other sleeve in such a manner that a relative adjustment between the two sleeves is also provided which determines the relative concentricity of the individual cores forming the tube wall. This adjustment is effected by a second set of adjusting screws which determines the spacing of a concentricity throat established by a closely spaced projecting shoulder and lip formed on the two sleeves.

Another feature of this invention relates to the novel structural arrangement provided for uniting the materials forming the individual cores of a multiple-layer extruded tube. In the structural improvement disclosed herein, the materials constituting the two cores are united in an area adjacent a material feed outlet formed between the two sleeves. This outlet is formed in part by beveling or flaring the inside bore of one of the sleeves adjacent the central pipe. This particular outlet configuration provides highly efficient fusion of the two cores, inasmuch as the materials forming the individual cores are permitted to flow directly together.

In order that all of the features for attaining the objects of this invention may be readily understood, detailed reference is herein made to the foregoing drawings wherein:

Figure 1 is a sectional view of a preferred embodiment of the extrusion die of this invention, Figure 2 is a sectional view taken along line 2—2 of Figure 1, and Figure 3 is a view of a portion of the structure shown in Figure 1 and showing in enlarged detail the structure of the concentricity and back-pressure throats.

Referring now to the preferred embodiment of the invention shown in the drawings, the casing of the extrusion die comprises a central ring 3 and a flat ring 4 fixedly coupled one to the other by means of a plurality of circularly disposed screws 5. The composite bore of rings 3 and 4 is formed with a stepped contour defined by the different inside diameters of the two rings.

End plug 6 is inserted into the bore of central ring 3 and is fixedly coupled to this ring by a plurality of circularly disposed screws 7. A tapered washer 8 is positioned over the shank of end plug 6 and within the bore of ring 3. A feed tube 9 is coupled to ring 3 and a circular passage 10 is formed through central ring 3 in axial alignment with the bore of tube 9. The leftmost circumferential point of passage 10 is positioned closely to the rightmost edge of the upper surface of tapered washer 8, whereby the flow of liquid material through feed tube 9 and passage 10 into reservoir 11 is directed in part by tapered washer 8.

The right end of plug 6 is notched to receive a mating shoulder formed in the left end of a pipe 12 inserted within the composite bore of rings 3 and 4. End plug 6 and pipe 12 are fixedly coupled with respect to one another by means of coupling pipe 13. The left portion of pipe 12 is formed with a head 14 serving as a mandrel for shaping into tubular form the material fed into the die at feed tube 9. It should be noted that components 3, 4, 6, 8, 12 and 13 are fixedly positioned on a single common axis.

Rings 3 and 4 lock a central sleeve 15 having a stepped outside diameter into associative coupling with pipe 12 so that the closely adjacent surfaces of pipe 12 and sleeve 15 can further form the tubular layer of material advancing past the mandrel.

A pair of gaps 16 and 17 are provided between the overlapping portions of rings 3, 4 and sleeve 15 whereby movement of sleeve 15 in a direction transverse to the longitudinal axis of the die is permitted. A plurality of circularly disposed screws 18 pass through the shoulder formed at the right end of ring 3 so that the terminal ends of these screws contact central sleeve 15. The particular setting of screws 18 determine the relative concentricity of sleeve 15 with respect to the longitudinal axis of the die, which axis also serves as a common axis for pipe 12.

End ring 19 is positioned on the right portion of central sleeve 15 with a relatively tight friction fit, and end sleeve 20 is fastened to the right end of sleeve 15 by a plurality of circularly disposed screws 21. A gap 22 is provided between overlapping portions of end ring 19 and end sleeve 20. The bore holes within end sleeve 20 which receive the shanks of screws 21 are relatively larger than the shanks so that minute relative positioning between central sleeve 15 and end sleeve 20 is provided by manually adjusting screws 23 carried by end ring 19.

As is best shown in the enlarged view of Figure 3, end sleeve 20 is formed with a projecting lip 25 which is positioned in an adjustable mating relationship with a projecting shoulder 26 formed on the right end of central sleeve 15. The spacing 27 between projecting lip 25 and shoulder 26 in a direction transverse to the longitudinal axis of the die is determined by manual adjustment of set screws 23.

Feed tube 30 is coupled to end sleeve 20, and bore passage 31 within end sleeve 20 connects reservoir 32 to the feed tube 30. The spacing 33 between projecting lip 25 and sleeve 15 defines a throat which couples reservoir 32 to outlet 34 and at the same time provides the necessary back pressure to cause liquid within reservoir 32 to flow and fill completely the ring-like reservoir 32. The inside bore of end sleeve 20 is beveled or flared outwardly at 35 in order to provide for proper mating of the liquid materials comprising the inner and outer layers of the multiple core tubing, which liquids are joined together in this area.

The detailed operation of the extrusion die of this invention is as follows:

Feed tubes 9 and 30 are connected to the individual sources which are to supply the materials required in fabricating the inner and outer cores of the tube, respectively. For example, in the event that the die is to be employed in the fabrication of the tube disclosed in applicant's previously identified co-pending application, the source of pure polyethylene resin is connected to feed tube 9, and the source of polyethylene resin processed with a carbon black agent is connected to feed tube 30. The pure polyethylene resin flows from feed tube 9 through passage 10 into reservoir 11, completely filling the reservoir, and around head 14 which serves as a shaping mandrel and advances along the outer surfaces of pipe 12. At the narrow shank of pipe 12, the pure resin assumes a tubular form having an inside diameter which is defined by pipe 12.

Concurrently with the feeding of the material which is to constitute the inner core into tube 9, the material which is to constitute the outer core is fed into feed tube 30 thereby flowing into bore passage 31, reservoir 32, the back pressure throat defined by spacing 33, the concentricity throat defined by spacing 27 and thence into the outlet passage 34. This material unites with the inner core advancing along the shank of pipe 12 in such a manner as to provide two well-defined concentric cores which adhere to one another.

In the event that the total tube wall, including both inner and outer cores, is not concentric with the bore of the tube, screws 18 are manually adjusted so that central sleeve 15 which also carries end sleeve 20 is moved relative to pipe 12. The concentricity of the total tube wall with respect to its bore is thereby appropriately altered.

In the event that the relative concentricity of the inner and outer cores is not satisfactory, screws 23 are manually adjusted in the appropriate direction whereby end sleeve 20 is moved relative central sleeve 15 which is in a fixed position. This operation adjusts the spacing 27 of the concentricity throat defined by lip 25 and shoulder 26, and in turn the relative quantity of material supplied at various points on the periphery of circular outlet 34.

The spacing 33 of the back pressure throat between sleeve 15 and projecting lip 25 is relatively critical and is determined in the main by the size of pipe which is to be fabricated by the die. From a generic aspect, this spacing is determined so that the entire cross-sectional area of the back pressure throat is equal to the cross-sectional area of the bore of feed tube 30. The total cross-sectional area of the back pressure throat should preferably not be greater than the area of the feed tube for the reason that hydraulically equal pressure cannot be attained from the layer around the die if such were the case. In a typical preferred embodiment designed to fabricate a 1¼ inch tube, the spacing 33 was established at .007 inch.

In a preferred arrangement, the flare or bevel of end sleeve 20 is formed at approximately a 5 degree angle with the horizontal. This particular form for outlet passage 34, taken together with the fact that the materials from the two sources flow directly together in this area, assures highly satisfactory fusion between the two cores. These cores are united in a manner which introduces no inherent weakness or structural flow in the fabricated tube.

It is to be understod that the above-described arrangements are illustrative of the application of the principles of this invention. Numerous other arrangements may be devised by those skilled in the art without departing from the scope of the invention.

Having thus described the invention what is claimed as new and desired to be secured by Letters Patent is:

1. A die for extruding a multiple-core tube comprising a central ring, a flat ring fixedly coupled to said central ring, a pipe including a mandrel head positioned within the composite bore of said rings, said rings and pipe having a fixed and common axis, a central sleeve positioned over said pipe and supported by said rings for adjustable movement in a direction transverse to said axis, an end ring positioned over said central sleeve and movable therewith, an end sleeve supported by said end ring for adjustable movement in a direction transverse to said axis and being coupled to said central sleeve in an end to end relationship and positioned over said pipe, a projecting shoulder and an overlying projecting lip formed on the adjacent ends of said central and end sleeves, respectively, and providing a relatively small spacing between the two sleeves parallel and transverse the axis of the die and defining a back pressure throat and a concentricity throat, a feed tube connected to said central ring for supplying a first source of material which advances between said pipe and central sleeve toward said end sleeve, and a second feed tube connected to said end sleeve for supplying a second source of material to form an adhering outer core uniting with the inner core formed by the first source of material, said second source of material flowing from said second feed tube through a bore passage in said end sleeve, a reservoir formed between said sleeves, said throats and between said sleeves into an overlying relationship with respect to said inner core.

2. A die for extruding a multiple-core tube comprising a casing having a bore, a pipe including a mandrel head positioned within the bore of said casing, said casing and pipe having a fixed and common axis, a central sleeve positioned over said pipe and supported by said casing for adjustable movement in a direction transverse to said axis, an end ring positioned over said central sleeve and movable therewith, an end sleeve supported by said end ring for adjustable movement in a direction transverse to said axis and being coupled to said central sleeve in an end to end relationship and positioned over said pipe, a projecting shoulder and an overlying projecting lip formed on the adjacent ends of said central and end sleeves, respectively, and providing a relatively small spacing between the two sleeves parallel and transverse the axis of the die and defining a back pressure throat and a concentricity throat, a feed tube for supplying a first source of material which advances between said pipe and central sleeve toward said end sleeve, and a second feed tube connected to said end sleeve for supplying a second source of material to form an adhering outer core uniting with the inner core formed by the first source of material, said second source of material flowing from said second feed tube through a bore passage in said end sleeve, a reservoir formed between said sleeves, said throats and between said sleeves into an overlying relationship with respect to said inner core.

3. A die for extruding a multiple-core tube comprising a casing having a bore, a pipe positioned within the bore of said casing, said casing and pipe having a fixed and common axis, a central sleeve positioned over said pipe and supported by said casing for adjustable movement in a direction transverse to said axis, means coupled to said central sleeve and movable therewith, an end sleeve supported by said means for adjustable movement in a direction transverse to said axis and being coupled to said central sleeve in an end to end relationship and positioned over said pipe, a projecting shoulder and an overlying projecting lip formed on the adjacent ends of said central and end sleeves, respectively, and providing a relatively small spacing between the two sleeves parallel and transverse the axis of the die, a feed tube for supplying a first source of material which advances between said pipe and central sleeve toward said end sleeve, and a second feed tube connected to said end sleeve for supplying a second source of material to form an adhering outer core uniting with the inner core formed by the first source of material, said second source of material flowing between said sleeves.

4. A die for extruding a multiple-core tube comprising a casing having a bore, a pipe positioned within the composite bore of said casing, said casing and pipe having a fixed and common axis, a central sleeve positioned over said pipe and supported by said casing for adjustable movement in a direction transverse to said axis, means positioned over said central sleeve and movable therewith, an end sleeve supported by said end ring for adjustable movement in a direction transverse to said axis and being coupled to said central sleeve in an end to end relationship and positioned over said pipe, said end sleeve having its bore flared outwardly at the end adjacent the central sleeve, a projecting shoulder and an overlying projecting lip formed on the adjacent ends of said central and end sleeves and providing a relatively small spacing between the two sleeves parallel and transverse the axis of the die, means for supplying a first source of material which advances between said pipe and central sleeve toward said end sleeve, and means for supplying a second source of material to form an adhering outer core uniting with the inner core formed by the first source of material, said second source of material flowing between said sleeves.

5. A die for extruding a multiple-core tube comprising a casing having a central bore, a pipe positioned within said central bore, a pair of sleeves positioned within said bore and over said pipe in an end to end relation and coupled one to the other, means for supplying a source of material forming an inner core of said tube between one of said sleeves and said pipe and to advance in the direction of the other sleeve, means for supplying a second source of material between said sleeves for forming an outer core adhering to the inner core, means for simultaneously adjusting the position of both of said sleeves with respect to said pipe in a direction transverse to the axis of said pipe, and means for adjusting the relative position of one of said sleeves with respect to the other sleeve and the pipe.

6. A die for extruding a multiple-core tube comprising a casing having a central bore, a pipe positioned within said central bore, a pair of sleeves positioned within said bore and over said pipe and coupled one to the other, means for supplying a source of material forming an inner core of said tube between one of said sleeves and said pipe and to advance in the direction of the other sleeve, means for supplying a second source of material between said sleeves for forming an outer core adhering to the inner core, means for simultaneously adjusting the position of both of said sleeves with respect to said pipe in a direction transverse to the axis of said pipe, and means for adjusting the relative position of one of said sleeves with respect to the other sleeve and the pipe in a direction transverse to the axis of said pipe.

7. A die for extruding a multiple-core tube comprising a casing having a central bore, a pipe positioned within said central bore, a pair of sleeves positioned within said bore and over said pipe in an end to end relation and coupled one to the other, a projecting element protruding from each of the adjacent ends of said sleeves and positioned closely to define a spaced passage between the sleeves both parallel and transverse to the longitudinal axis of the pipe, means for supplying a source of material forming an inner core of said tube between one of said sleeves and said pipe and to advance in the direction of the other sleeve, means for supplying a second source of material between said sleeves and said projecting elements for forming an outer core adhering to the inner core, means for simultaneously adjusting the position of both of said sleeves with respect to said pipe in a direction transverse to the axis of said pipe, and means for adjusting the relative position of one of said sleeves with respect to the other sleeve and the pipe.

8. A die for extruding a multiple-core tube comprising a casing having a central bore, a pipe positioned within said central bore, a pair of sleeves positioned within said bore and over said pipe in an end to end relation and coupled one to the other, a projecting circular element extending at each of the adjacent ends of said sleeves and coupled to define a spaced passage between the sleeves both parallel and transverse to the longitudinal axis of the pipe, means for supplying a source of material forming an inner core of said tube between one of said sleeves and said pipe and to advance in the direction of the other sleeve, means for supplying a second source of material between said sleeves for forming an outer core adhering to the inner core, means for simultaneously adjusting the position of both of said sleeves with respect to said pipe in a direction transverse to the axis of said pipe, and means for adjusting the relative position of one of said sleeves with respect to the other sleeve and the pipe in a direction transverse to the axis of the pipe.

9. A die for extruding a multiple-core tube comprising a casing having a central bore, a pipe positioned within said central bore, a pair of sleeves positioned within said bore and over said pipe in an end to end relation and coupled one to the other, one of said sleeves having its bore flared outwardly at the end adjacent the other sleeve, a projecting circular element extending at each of the adjacent ends of said sleeves and coupled to define a spaced passage between the sleeves both parallel and transverse to the longitudinal axis of the pipe, means for supplying a source of material forming an inner core of said tube between one of said sleeves and said pipe and to advance in the direction of the other sleeve having the flared bore, means for supplying a second source of material between said sleeves for forming an outer core adhering to the inner core, means for simultaneously adjusting the position of both of said sleeves with respect to said pipe in a direction transverse to the axis of said pipe, and means for adjusting the relative position of one of said sleeves with respect to the other sleeve and the pipe.

10. A die for extruding a multiple-core tube comprising a casing having a central bore, a pipe positioned within said central bore, a pair of sleeves positioned within said bore and over said pipe in an end to end relation and coupled one to the other, one of said sleeves having its bore flared outwardly at an end adjacent the other sleeve, means for supplying a source of material forming an inner core of said tube between one of said sleeves and said pipe and to advance in the direction of the sleeve having the flared bore, means for supplying a second source of material between said sleeves for forming an outer core adhering to the inner core, means for simultaneously adjusting the position of both of said sleeves with respect to said pipe in a direction transverse to the axis of said pipe, and means for adjusting the relative position of one of said sleeves with respect to the other sleeve and the pipe.

References Cited in the file of this patent

UNITED STATES PATENTS

| 1,618,026 | Royle | Feb. 15, 1927 |
| 2,607,078 | Grimes | Aug. 19, 1952 |

FOREIGN PATENTS

| 550,537 | Germany | May 18, 1932 |
| 354,837 | Great Britain | Aug. 17, 1931 |